Patented Nov. 20, 1934

1,981,608

UNITED STATES PATENT OFFICE 1,981,608

PROCESS FOR PRODUCING AN AQUEOUS WAX EMULSION

Harry Bennett, Brooklyn, N. Y.

No Drawing. Application June 23, 1932,
Serial No. 618,944

3 Claims. (Cl. 134—1)

The invention relates to a process of emulsifying water insoluble substances with water.

It has for an object to prepare a permanent emulsion which is useful for depositing a thin layer of a substance upon a surface, and more especially an emulsion which is characterized by the fact that, when dry, it is not only lustrous but water-repellent immediately upon drying.

A further object of the invention resides in the provision of an emulsion which clings more tenaciously to a surface to which it is applied and which, when applied to a surface, dries readily to a transparent, lustrous, thin film.

Another object of the invention resides in the provision of an emulsion of this nature which is of relatively low alkalinity and of high stability.

In a previous patent, No. 1,807,563, granted to me May 26, 1931, I have disclosed a process for preparing an emulsion in which a saponified mixture and beeswax or the like are dissolved in a volatile hydrocarbon solvent, water then being added to effect the emulsion. Such emulsion, however, does not effect a glossy or lustrous finish when applied to a surface nor does it possess the aforesaid properties, as its film or coating is translucent or opaque and not water-repellent. Moreover, in its use it introduces a fire hazard in the volatile hydrocarbon ingredient.

I have found that, under certain conditions, not only may such solvent be entirely eliminated, but that a much more satisfactory emulsion may be obtained.

I am aware, also, that it has been proposed previously to emulsify with water waxes or materials of a like nature by means of products from amines and fatty acids. The resulting emulsions, however, are all characterized by a lack of high lustre, stability, fluidity and homogeneity and, in many cases, by the film deposited from such an emulsion being discontinuous, non-adhesive and lacking water-repellent qualities. By preparing an emulsion from these substances in the novel manner set forth, an emulsion results which does not possess these objectionable features.

In preparing the novel emulsion, the following procedure, by way of example, may be employed. One and one-half parts by weight of tri-hydroxyethylamine is mixed with an equal amount of linoleic acid, and the same are stirred and heated at atmospheric pressure to a temperature of preferably 90° C. until a homogeneous mixture thereof is attained.

To this mixture, there is added twelve parts of carnauba wax, the temperature being maintained above the melting point of the wax to melt the same and incorporate it as a homogeneous mass with the aforesaid mixture.

The heating is then discontinued and there is slowly added fifty parts more or less—depending upon the desired consistency of the emulsion—of boiling water with vigorous stirring, which is continued until the emulsification is complete or the resulting emulsion has cooled to room temperature.

To enhance the spreading property of the emulsion, there may be added to the same one percent or less of terpineol, dipentene, pine oil, eugenol, etc., this ingredient being introduced with the wax or immediately before or after adding the same.

Another example wherein an amine, a fatty acid and a wax—partly replaced by a resin—are emulsified is set out as follows:

One and one-half parts by weight of monohydroxyethylamine is mixed with an equal amount of palmitic acid, heated to obtain a homogeneous mixture thereof; and to this are added eight parts of carnauba wax and two parts of shellac while continuing the heating. When a homogeneous mixture of all these ingredients has been attained, the heating is discontinued and fifty parts, more or less, of boiling water are slowly added with vigorous stirring until emulsification is complete. One percent, more or less, of a dispersing agent such as dipentene may be added, if desired.

The novel emulsion is of a thinner consistency than the emulsion referred to in my aforesaid patent and its cost of preparation is materially less in the absence of the organic solvent and whereby also the fire hazard is greatly reduced and not only in the preparation of the emulsion but also in its application.

It may be applied to form a film or coating on material such as textiles, certain foods, linoleum, leather, wood, asphalt, cement and various composition surfaces, drying to a transparent lustrous film. When applied to metallic or substantially non-porous surfaces, the gloss may not be present but can be brought out by light buffing.

The film formed on the various surfaces adheres very strongly to a surface to which it has been applied, being much more tenacious than the usual wax film; and, furthermore, it is immediately water-repellent upon drying so that any water contracting therewith will not cause the same to turn white as is the case with the usual wax-emulsion surface finishes.

The following may be substituted for the trihydroxyethylamine: mono-hydroxyethylamine and di-hydroxyethylamine, or higher hydroxyamines such as propyl-hydroxyamines, butyl-hydroxyamines, etc.; ethylene diamine, or the higher alkyl diamines; hydroxids of the alkaline earths or ammonia, ammonium compounds or other alkyl amines; sulphonic acids, their salts and their derivatives; sulphonated higher alcohols or their derivatives.

The following may be substituted for the linoleic acid: hydroxystearic acid, sebacic acid, oleic, stearic and other fatty acids having more than five carbon atoms and but one carboxyl group, or mixtures of the same; abeitic, naphthenic and similar acids; saponifiable fats, oils and waxes.

The following may be substituted for the carnauba wax: Japan, candelilla or other vegetable waxes, or blends of the same; paraffin or chlorinated paraffins or other mineral waxes, or blends of the same; fats, oils or greases, or blends of the same; gums, natural or synthetic resins, varnish, and rubber latex, or blends of the same; shellac wax or insect waxes, or blends of the same.

I claim:

1. The process of forming an aqueous emulsion comprising mixing equal parts of an aliphatic amine and a fatty acid having more than five carbon atoms and but one carboxyl group and heating the mass at atmospheric pressure until a homogeneous mixture thereof is attained, thereafter adding a wax while maintaining the temperature to incorporate said material as a homogeneous mass with the said mixture, discontinuing the heating, and then adding boiling water slowly with constant agitation until emulsification is completed, said emulsion when applied to a surface drying directly with a bright gloss.

2. The process of forming an aqueous emulsion comprising mixing equal parts of tri-hydroxyethylamine and linoleic acid and heating the mass at atmospheric pressure until a homogeneous mixture thereof is attained, thereafter adding carnauba wax while maintaining the temperature to incorporate said wax as a homogeneous mass with the said mixture, discontinuing the heating, and then adding boiling water slowly with constant agitation until emulsification is completed, said emulsion when applied to a surface drying directly with a bright gloss.

3. The process of forming an aqueous emulsion comprising mixing by weight one and one-half parts of tri-hydroxyethylamine and one and one-half parts of linoleic acid and heating the same until a homogeneous mixture thereof is attained, adding thereto twelve parts by weight of carnauba wax while maintaining the temperature above the melting point of the wax, discontinuing the heating and slowly adding approximately fifty parts by weight of boiling water with continued agitation until emulsification is completed, said emulsion when applied to a surface drying directly with a bright gloss.

HARRY BENNETT.